Dec. 2, 1952  F. E. OBERMAIER  2,620,133
MIXING VALVE
Filed May 28, 1949  4 Sheets-Sheet 1
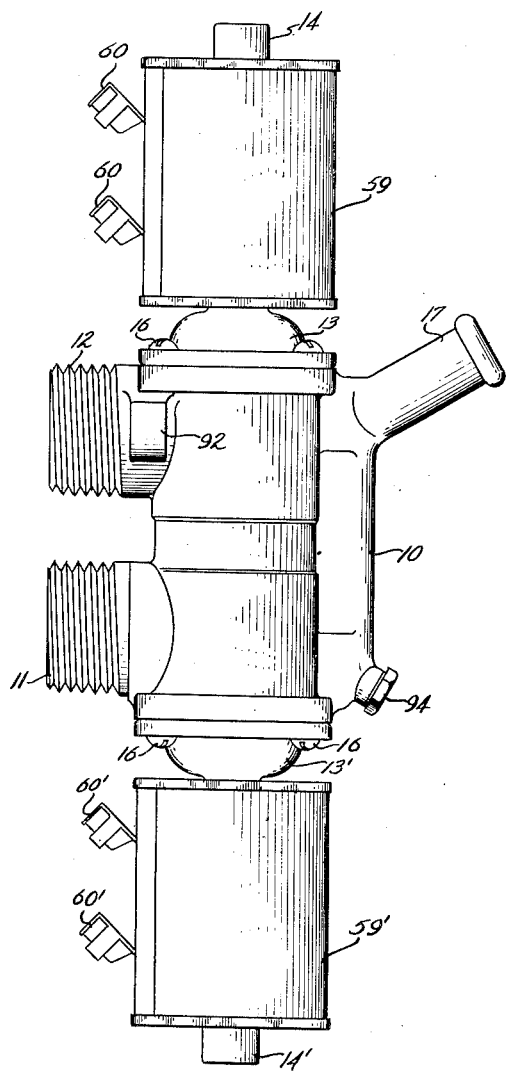
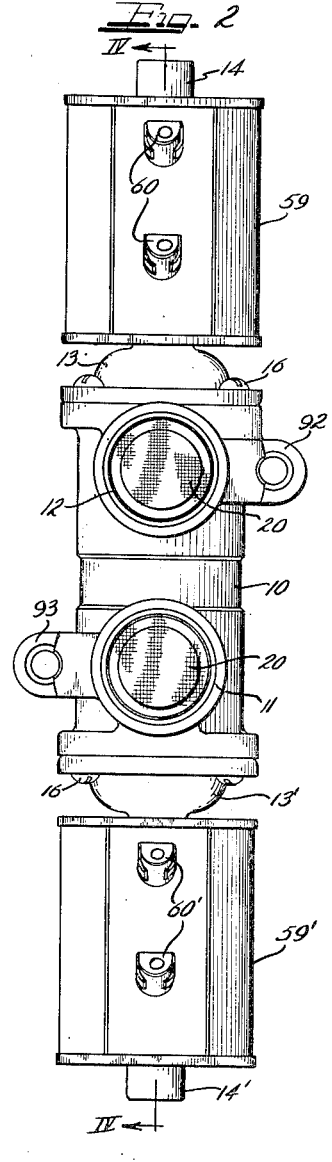
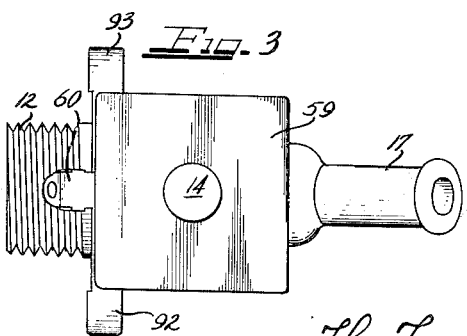
Inventor
FRANK E. OBERMAIER
by The Firm of Charles W. Hills Attys.

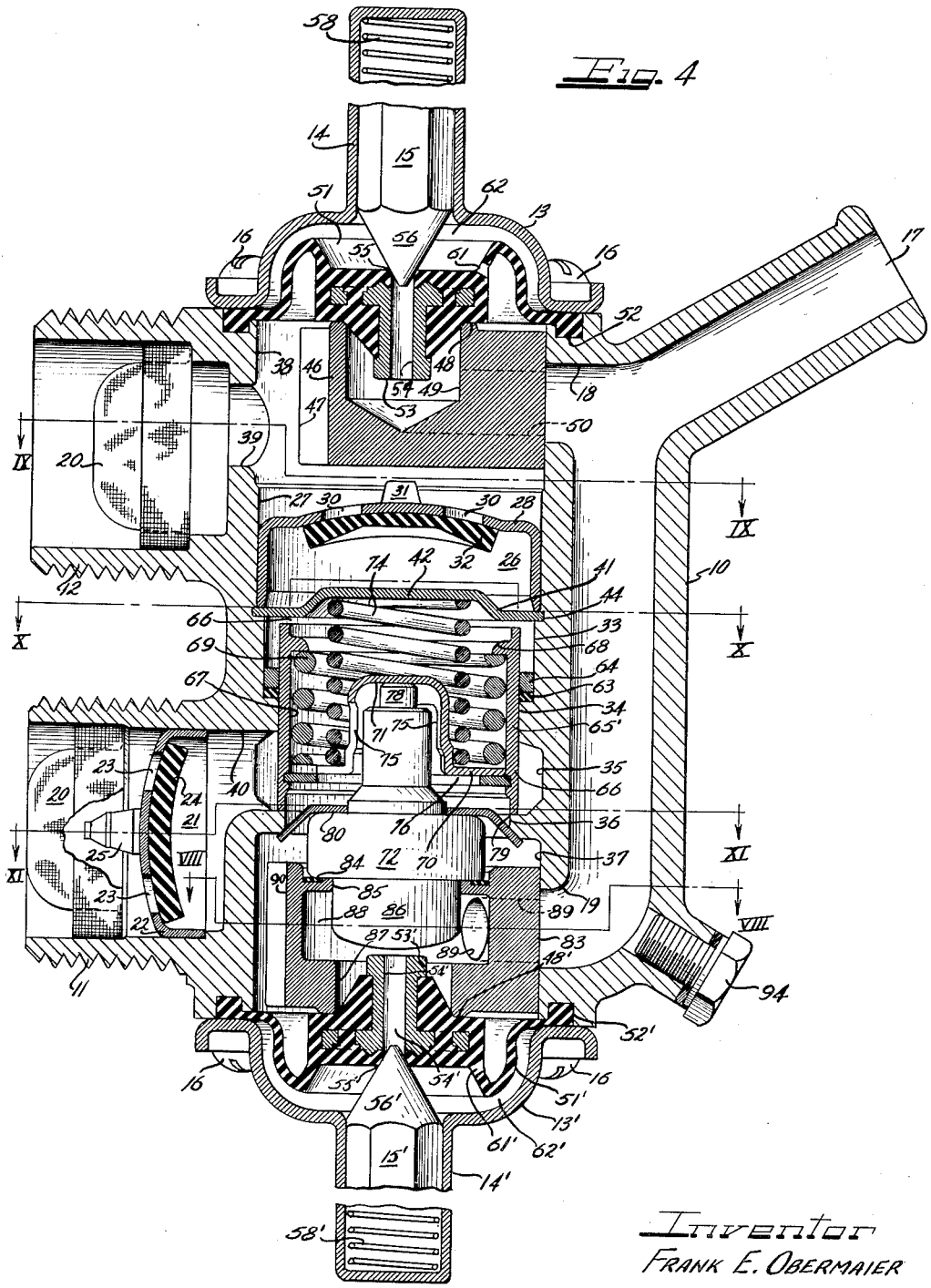

Dec. 2, 1952  F. E. OBERMAIER  2,620,133
MIXING VALVE
Filed May 28, 1949  4 Sheets-Sheet 3
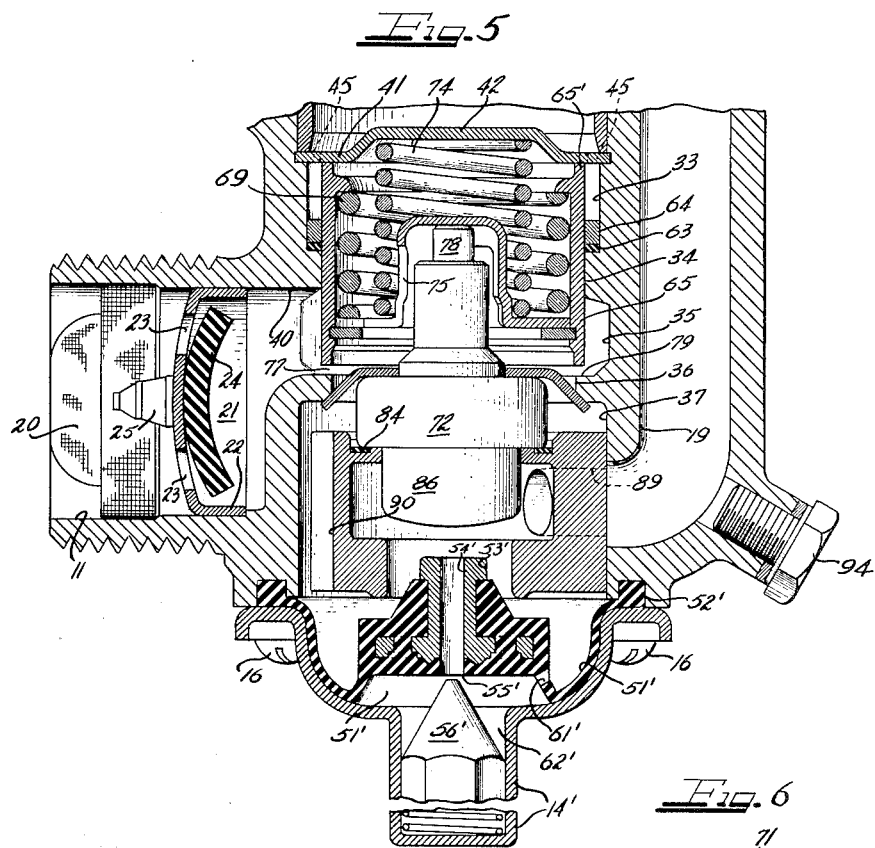
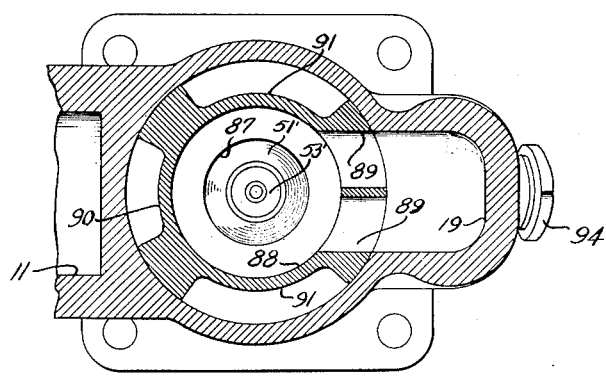
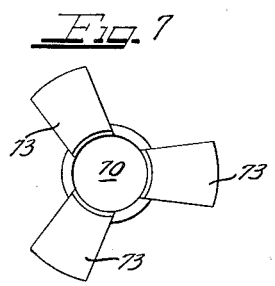
Inventor
FRANK E. OBERMAIER
by The Firm of Charles W. Hills
Attys.

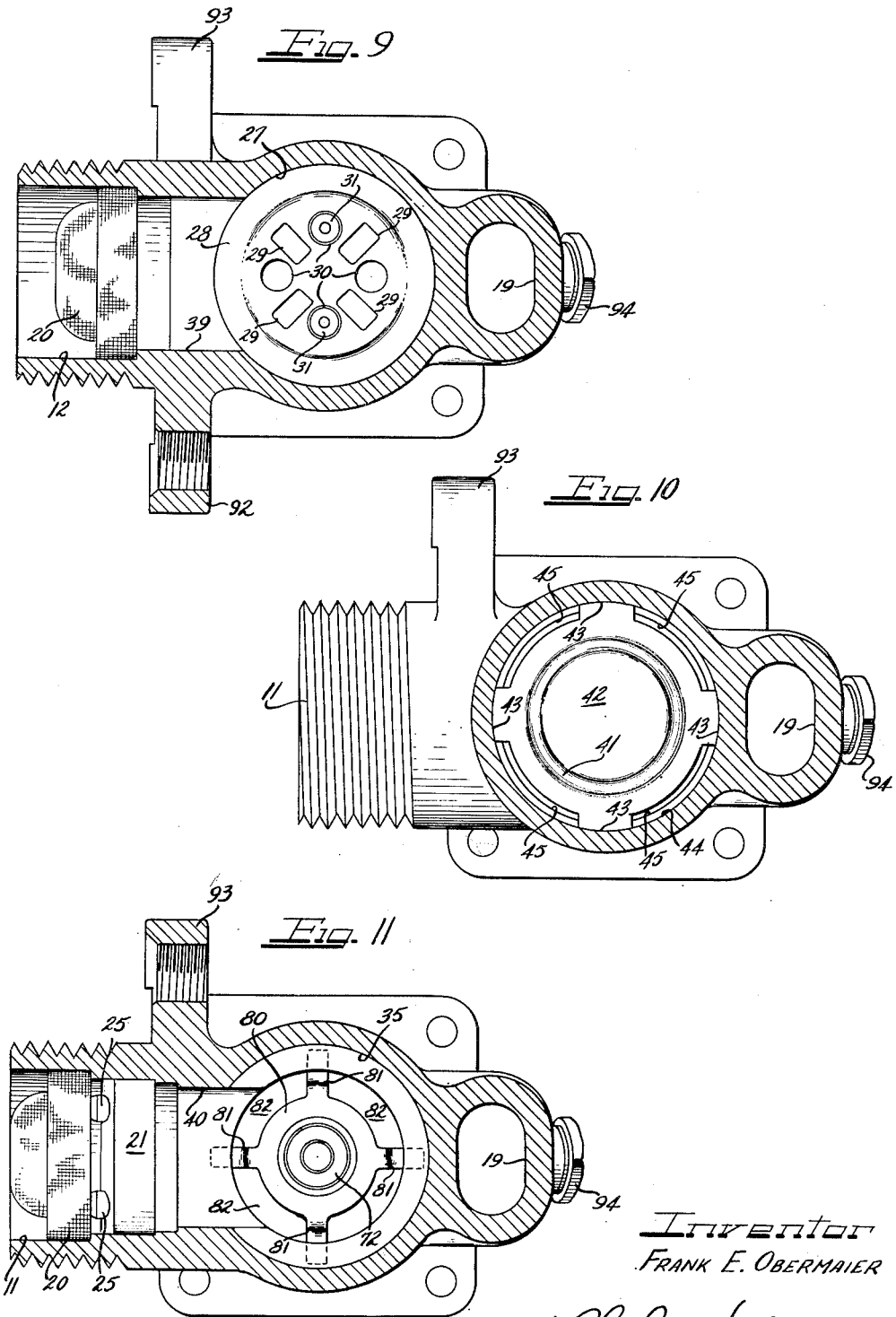

Patented Dec. 2, 1952

2,620,133

UNITED STATES PATENT OFFICE 2,620,133

MIXING VALVE

Frank E. Obermaier, Oak Park, Ill., assignor to The Dole Valve Company, Chicago, Ill., a corporation of Illinois Application May 28, 1949, Serial No. 95,933

12 Claims. (Cl. 236—12)

My invention relates to thermostatically controlled fluid mixing valves wherein the relative amounts of fluid from two different sources are proportioned to achieve a fluid stream of predetermined temperature.

More particularly, my invention relates to a type of a thermostatically controlled and solenoid-operated fluid mixing valve in which one of the fluids admitted to the mixing valve, particularly the hot fluid, may be by-passed, in order that the upper and lower temperature range of the fluid delivered by the mixing valve may be, respectively, the temperature of the hot fluid and the predetermined temperature of the mixture of the hot and cold fluids.

Prior to my invention, mixing valves of this type have been in use but these mixing valves presented difficulties in machining in that the chambers for the fluids to be mixed were usually laterally spaced and the solenoids for actuating the valves were also positioned side by side forming a relatively bulky piece of equipment in the space usually permitted for the mixing valve in the assembled apparatus, such as a washing machine and the like.

It is, therefore, a principal object of my invention to provide an improved fluid mixing valve which may be readily machined and produced at a minimum cost.

A further object of my invention is to provide an improved fluid mixing valve having one fluid mixing chamber and having only two connections for sources of fluid.

Further, it is an object of my invention to provide a fluid mixing valve where an undesired reversed fluid flow cannot take place.

Still another object of my invention is to provide an improved fluid mixing valve having a plurality of fluid supply chambers and means to select fluid from these chambers without altering the total rate of fluid flow through the valve.

It is another object of my invention to provide an improved fluid mixing valve having a convenient and accessible arrangement for draining fluids therefrom.

Another object of my invention is to provide an improved fluid mixing valve provided with an improved fluid by-pass and check valve construction.

Another object of my invention is to provide an improved check valve construction for a mixing valve.

Another object of the invention is to provide an improved thermostatically-actuated proportioning valve construction for maintaining the mixed fluid within a predetermined range of temperature.

It is still another object of my invention to provide an improved fluid mixing valve having features of construction, combination and arrangement whereby a relatively simple plain casting is required to the end that the valve may be simply and inexpensively machined and constructed.

The novel features which I believe to be characteristic of my invention are set forth with particularity in the appended claims. My invention, itself, however, both as to its organization and method of operation, together with further objects and advantages thereof, may best be understood by reference to the following description taken in connection with the accompanying drawings.

On the drawings:

Figure 1 is a view in elevation of a solenoid-operated by-pass type mixing valve incorporating the features of my invention;

Figure 2 is a vertical elevational view taken from the left-hand side of the fluid mixing valve of Figure 1;

Figure 3 is a plan view of the mixing valve of Figures 1 and 2;

Figure 4 is a vertical view, partly in cross-section, of the by-pass mixing valve with the solenoids removed, illustrating the thermostatically controlled mixing valve and diaphragm valves;

Figure 5 is an enlarged vertical cross-sectional view through the mixing chamber of the mixing valve showing the mixing valve in the open position for the passage of cold water and the diaphragm valve open for the discharge of the mixed fluid;

Figure 6 is a vertical sectional view of the spring saddle for the thermostatically controlled mixing valve;

Figure 7 is a plan view of the spring saddle of Figure 6;

Figure 8 is a horizontal sectional view taken along lines VIII—VIII of Figure 4 illustrating the construction of the diaphragm seat for the mixed side of the mixing valve;

Figure 9 is a horizontal sectional view taken along line IX—IX of Figure 4 illustrating the hot water intake and cap for the hot water check valve;

Figure 10 is a horizontal sectional view taken along the line X—X of Figure 4 illustrating the seat for the hot water mixing valve; and Figure 11 is a horizontal sectional view taken along line XI—XI illustrating the cold water inlet and the spring element retainer.

As shown on the drawings:

In Figures 1, 2, 3 and 4, a body portion 10 of a fluid mixing valve is preferably cast or molded from some simple material, such as, for example, cast brass. On one side of the body 10 are provided two fluid inlet receptacles 11 and 12, respectively, for the cool and hot fluids. Similarly formed closure elements 13 identified by primed reference characters are attached to the top and bottom of the body 10 and include an extension 14 for a fluid control plunger or armature 15 which operates to control fluid flow in a manner to be described in further detail hereinafter. The upper and lower closure elements 13 are attached to the body portion 10 through suitable securing means 16 and serve to hold the operative elements of the fluid valve structure in place. The construction of the closure elements permits the ready assembly of the valve and access to the interior of the valve for inspection and repair. Regulated fluid is taken from the fluid valve structure through an outlet member 17 which is integrally formed with the body 10 and connected to the interior of the valve structure through passages 18 and 19, Figure 4.

The passage 18 is the by-pass outlet of the hot fluid to the outlet member 17 while the passage 19 is the outlet passage of the mixed fluid to the outlet member 17.

The arrangement of the operative elements within the fluid valve structure of Figures 1, 2 and 3 may be best understood by reference to Figure 4 which is a cross-sectional view through the axis IV—IV, Figure 2. As shown in Figure 4, the hot and cold fluid inlets 11 and 12 are provided with similar strainers 20 which prevent dirt and other particles from entering the valve proper.

In addition, the cold fluid inlet 11 is provided with a fluid check valve 21. The cold fluid check valve assembly 21 is formed as illustrated in the cross-section thereof by a cup member 22 perforated at 23 and is provided with a flexible disk 24. In Figure 4, the cold fluid check valve assembly 21 is shown closed and is shown in its open position in Figure 5. The flexible disk portion 24 is formed with outwardly extending protuberances 25 symmetrically spaced, extending through perforations in the caps for suitably securing the disk in position and permitting also replacement of the disk for repair.

The screen 20 and the cold water check valve assembly are mounted in the cold water inlet passage as illustrated in Figure 4.

While the cold water inlet passage is provided with a cold water check valve assembly, the hot water inlet is only equipped with the filter screen. However, a hot water check valve 26 is provided, but this valve is provided in the main chamber 27 formed in the main body 10 of the mixing valve in order that the hot fluid may be by-passed, as will be described later with reference to the operation of the valve. It also permits flow of hot fluid into the mixing chamber and prevents the mixed fluid from backing up into the hot fluid. The hot fluid check valve 26 is similarly formed as the cold water check valve, but it is larger in size and the operating parts of the mixing valve are assembled from this side of the mixing valve, as will be seen from an inspection of Figure 4.

The check valve 26 comprises a cup 28 perforated with symmetrically spaced holes 29, Figure 9, and also with symmetrically spaced holes 30, which are formed as illustrated in Figure 9 to receive integrally molded protuberances 31 of the flexible disk 32. The protuberances 31 secure the disk in its operating position with respect to the cup member of the check valve.

The flexible disks 24 and 32 are formed from suitable flexible material thus being molded, for example, of a suitable rubber composition or a synthetic composition material which will withstand the repeated flexing and also the temperature of the fluid in their operating position.

The cup members 22 and 28 of the hot and cold water check valves have similarly formed perforations. For example, as illustrated, with respect to the perforations of the hot water check valve shown in Figure 9, there are four substantially rectangular perforations and four circular perforations, and the circular perforations are adapted to receive and lock the protuberances 25 and 31 of the disks 24 and 32 in operating position with respect to the perforations of the cup.

The flexible disk seats of the hot and cold water check valves 21 and 26, respectively, are normally biased closed. When the fluid pressure, for example, within the cold fluid inlet 11 exceeds the pressure within the valve chamber, the disk 24 is pushed inwardly and permits fluid flow from the fluid inlet into the mixing chamber. The same is true with respect to the operation of the flexible disk 32. The back pressure of the fluid within the mixing chamber will cause the disks 24 and 32 to seal the openings within their respective caps as illustrated in Figure 4 to prevent flow of any mixed fluid into either the cold or hot water inlets 11 and 12.

It will be thus evident that fluid flow from the hot and cold fluid inlets, respectively, into the mixing chamber takes place if, and only if, the fluid pressure applied to the hot and cold fluid inlets is sufficient to overcome the biasing of the hot and cold check valves together with excess fluid pressure as may exist within the mixing chamber back of each of the check valves with respect to the direction of flow of fluid thereto.

The body 10 comprises a series of interconnected annular chambers of various diameters, respectively, identified as the chamber 27, chamber 33, connecting passage 34, chamber 35, connecting passage 36, and chamber 37. The chamber 27 is connected to the hot water inlet 12 by a chamber 38 and a passage 39. The chamber 38 is also connected to the outlet member 17 through the passageway 18. The chamber 35 is connected to the cold fluid inlet 11 through a passageway 40.

Referring to Figure 4, the assembly of the parts making up the mixing valve will be described beginning from the hot fluid side of the mixing valve. A hot water seat 41 having a recessed center portion 42 for the purpose to be described later is preferably formed, as illustrated in Figure 10, and includes laterally extending prongs 43 engaging an annular groove 44 to form passageways 45 for the entrance of the hot fluid to the chamber 33. The prongs 43 engage the annular groove 44 affixing the hot water seat to the body of the mixing valve and serves to separate the chamber 27 from the chamber 33, these chambers being connected by the passages 45, Figure 10.

The hot water check valve 26 is mounted within the chamber 27 and the bottom edge of the cup 28 is seated on the prongs 43, as illustrated in Figure 4.

A diaphragm seat and hot by-pass member 46 is mounted within the chamber 38 and may be press-fitted therein with a light press fit. The diaphragm seat and hot by-pass member 46 is formed in transverse cross-section as illustrated in Figure 4. The diaphragm seat and by-pass member 46 is of a generally cylindrical formation, in horizontal cross-section with recessed portions formed therein to permit the passage of fluid thereby and including a recessed portion 47 facing the hot water inlet passage 39 for the flow of the hot fluid into the mixing valve chamber or through the by-pass member, as desired. The hot water by-pass member 46 is provided with an annular valve seat 48 and a central passage 49 discharging into a lateral passage 50 in alignment with the passageway 18.

As shown in Figure 4, a diaphragm type valve 51 of flexible material is formed in cross-section as illustrated, and is attached to the body 10 through an annular ring 52 which provides an effective seal between the body 10 and the closure element 13. The diaphragm type valve 51 extends over the annular valve seat 48 of the by-pass member 46. The diaphragm 51 is provided with a brass insert 53 integrally molded with the flexible material of the diaphragm and formed in cross-section as illustrated in Figure 4. The brass insert is provided with an orifice 54 in alignment with an orifice 55 which seats the conical valve end 56 of the fluid control armature 15.

The armature 15 is spring-biased downwardly by a Phosphor bronze armature spring 58 and is contained within a fluid-tight extension 14 of enclosure element 13 so that movement thereof does not cause fluid leakage from the valve. Motion of this armature plunger 15 is obtained by current flow in a solenoid 59, Figure 1, the plunger 15 being constructed of magnetic material so as to respond to the magnetic field due to current flow within this solenoid. The solenoid 59 is connected to a suitable source of electrical energy through the terminals 60 which are, in turn, connected in a suitable timing circuit for actuating the mixing valve in a predetermined cycle of operation.

A small opening 61 is provided in the diaphragm 51 so that when the plunger or armature valve seat 56 covers the small central opening 55 therein, the pressure within an upper chamber 62 above the diaphragm is equal to the pressure within the chamber 38, the diaphragm 51 serving to separate the chambers 38 and 62 being connected by the passage or bleed hole 61.

Inasmuch as the surface area exposed to the fluid pressure on the top side of the diaphragm or the side contiguous to the conical valve end 56 exceeds the surface area exposed thereto on the underside thereof, the diaphragm 51 is pressed inwardly against the seat 48, and no fluid flow takes place from the cavity 38 to the central passage 49. However, if the plunger 15 is raised so as to permit fluid flow through the orifice 54, fluid flows from the chamber 62 to the chamber 49 and, by reason of the restricted area of the passage 61, the pressure in chamber 62 approaches that of the pressure on the underside of the diaphragm 51 and causes motion thereof in the upward direction, Figure 4, or away from the valve seat 48, thereby permitting fluid flow from the cavity 38 to the chamber 49 discharging through the passage 50 into the passageway 18 to be finally discharged from the outlet member 17. In this manner, the hot fluid entering to the fluid inlet 12 may be by-passed to the discharge opening 17 upon the solenoid being actuated so that the armature 15 is raised permitting the unseating of the diaphragm 51 from the valve seat 48. When the hot fluid is by-passed, the flexible diaphragm 32 of the hot check valve 26 is in the position as shown in Figure 4 being closed so that no hot fluid discharges downwardly through the port of the hot check valve.

When the plunger 15 is subsequently permitted upon the deenergization of the solenoid 59 to close the opening 55 by the conical pilot valve 56 thereby preventing fluid flow thereto, fluid flows through the restricted passage 61 to the chamber 62 and eventually builds up pressure therein corresponding to the unit fluid pressure within the cavity 38. This removes the net upward force upon the member 51 associated with the total pressure difference between the chambers 62 and 38 and causes closure of the valve. It is thus evident that fluid flow through passages 49 and 50 in the hot by-pass member 46 is controlled by the position of the plunger 15.

Referring to Figure 4, the various members of the mixing valve will be described with reference to the cold fluid side of the mixing valve, and the subsequently assembled parts thereof in the mixing chamber side of the valve.

In assembling the mixing valve, a piston seal 63 and a piston seal retainer 64, together with a piston and saddle assembly 65 are assembled in the chamber 33 prior to assembling the hot water seat 41 as previously described after which the members forming the assembly on the hot water side of the mixing valve will be assembled from outside of the valve as described above.

The piston and saddle assembly 65 is formed as illustrated in Figures 4 and 5 comprising a piston 65' adapted to be engaged by the seal 63 and to be slidably mounted through the connecting passage 34. The length of the piston 65' is slightly less than the combined lengths of the chambers 33, 34 and 35 to provide an opening 63, Figure 4, between the end of the piston and the hot water seat 41 to permit the hot fluid to pass through the openings 29 and 30 of the hot water check valve 26, through the openings 45, Figure 10, and through the passage 66 to the passageway 67 provided by the piston and saddle assembly 65. The piston 65' is provided with an annular flange 68 on the interior of the piston to permit passage of the fluid through the piston and also to seat an over-travel spring 69 formed of stainless steel.

A spring saddle 70, Figures 4, 5, 6, and 7, is provided with a center portion 71 adapted to be engaged by a thermostatic control element 72, Figures 4 and 5. The spring saddle 70 is provided with laterally extending members 73, Figures 6 and 7, to provide a seat for the over-travel spring 69 and also a seat for the return spring 74. The spring saddle 70 is provided with ports 75 to permit flow of the fluid through the center of the piston 65'. A retaining ring 76 complementally formed with respect to an annular groove in the piston 65' serves to maintain the spring saddle 70 and the over-travel spring 69 in assembled position.

From the above description, it is evident that there has been disclosed a simple assembly of a piston saddle assembly 65 comprising the over-travel spring 69, the spring saddle 70 and the retaining ring 76.

After the piston and saddle assembly 65 has been assembled, the return spring 74 is mounted as illustrated in Figure 4 to seat against the recess portion 42 of the hot water seat 41 on one end and on the opposite end to seat against the laterally extending members 73 of the spring saddle 70 when the piston and saddle assembly is assembled in the connecting passage 34 after which the hot water seat 41 is assembled and secured in position in the valve body.

Referring to Figure 5, the length of the piston and saddle assembly 65 is less than the combined length of the passages 33, 34 and 35 to provide an opening 77, illustrated in Figure 5, when the thermostatic control element 72 is actuated by the temperature of the fluid within the mixing valve to move the piston and saddle assembly 65 to seat against the hot water seat 41. This movement prevents the flow of the hot fluid through the ports 45 by closing the opening 66 illustrated in Figure 4.

As shown in Figure 5, the hot fluid, with the piston controlled to shut off the flow of the hot fluid, still enters through the ports 45 into the chamber 33 and is prevented from passing through the center of the piston as the piston is seated against the hot water seat 41. With the piston and saddle assembly 65 in position shown in Figure 5, the flow of the fluid which enters through the inlet connection 11 discharges through the openings in the cold water check valve 21 into the passage 40 and through the annular opening 77. From there, the fluid discharges through the passageway 36 and across the thermostatic control element 72 mixing with any of the hot fluid being discharged through the interior of the piston saddle assembly 65.

The thermostatic control element 72 may be any one of various types well known in the art. Principally, this element is of a so-called power element type in which a powerful expanding action is produced in correspondence with any increase in temperature, this expanding action being developed between the fixed portion of the thermostatic control element and the movable member 78 thereof. The movable member 78, Figure 4, is shown in its retracted position, cutting off the flow of cool fluid supply and opening the piston and saddle assembly 65 to its maximum position as shown by the opening 66 permitting the flow of the hot fluid into the interior of the mixing valve. In Figure 5, the movable member 78 is shown in extended position moving the piston and saddle assembly 65 to shut off the flow of hot fluid into the mixing valve but permitting the flow of cool fluid through the opening 77.

Any over-travel of the movable member 78 due to excess of hot fluid temperature causes compression of the over-travel spring 69 through the movement of the spring saddle 70. Upon removal of the excess temperature condition, the over-travel spring 69, together with the return spring 74, returns the element 78 to its normal position as determined by the proper mixing of the hot and cold fluid to the predetermined temperature range. Due to the operation of the thermostatic control element 72, hot and cold fluids are proportionately mixed and the mixing valve formed by the piston and saddle assembly 65 is permitted to travel within the range of position illustrated by the opening 66 in Figure 4 in one extreme with the cold water inlet completely shut off and in the opposite extreme, as shown in Figure 5, with the hot fluid inlet shut off.

It is evident, therefore, that the control of the fluid flow through the chamber 37 is determined by the position of the piston and saddle assembly 65. The cylinder at its upper end engages the hot water seat 41 to cut off hot fluid supplied from the chamber 27, whereas, when its lower end engages the seat 79 formed in the chamber 35, it cuts off the fluid supply of the cold fluid from the chamber 35 to the chamber 37. The position of the cylinder 65 is determined by the control element 72, as is shown in Figures 4 and 5. Inasmuch as the length of the control element as determined by the movable member 78 varies in accordance with the temperature thereof, the piston 65' is moved relative to the body 10 within chambers 33, 34 and 35 in accordance with the temperature of the fluid within the chamber 37.

The thermostatic control element 72 is assembled in position with respect to the piston and saddle assembly 65 by a spring element retainer 80, Figures 4, 5 and 11. The spring element retainer 80 is provided with laterally extending prongs 81, Figure 11, engaging the periphery of the passageway 36 forming the passages 82 for the mixed fluids through the passageway 36 into the mixing chamber 37.

After the thermostatic control element 72 has been assembled, a diaphragm seat 83 for the mixed side of the valve having a seal 84 on its inner face is then pressed within the chamber 37. The diaphragm seat 83 like the diaphragm seat 46, is of a generally cylindrical formation in horizontal cross-section and has a plurality of recessed portions formed therein to allow fluid to flow thereby, as shown in Figure 8 and is provided with an opening 85 to receive the complementally formed portion 86 of the thermostatic controlled element 72.

Referring to Figures 4 and 8, the diaphragm seat 83 is provided with a seat 48' similar to the seat 48 of the by-pass member 46. A passage 87 is provided to a chamber 88 of the member 83 which is connected to the passage 19 by passageways 89, Figure 8.

The flexible diaphragm 51' generally formed as the diaphragm 51 is next assembled, referring to Figure 4, together with the plunger or armature 15' having springs 58' of the closure element 13'. The plunger or armature 15' is actuated through a solenoid 59' similar to the solenoid operating the diaphragm 51 for the hot by-pass member 46 and is connected to the electrical control circuit by terminals 60' for the energization of the valve in a predetermined cycle of operation.

As the operation of the diaphragm valve 51' and the circuit thereof is the same as described with reference to the diaphragm valve 51 for the hot fluid by-pass, further description of this diaphragm valve 51' and its operation is unnecessary. Therefore, the same reference characters and primed reference characters denote the same or similar parts.

The diaphragm seat 83 for the mixing fluid is recessed at 90 and 91, Figures 4 and 8, to permit the mixed fluid within the chamber 37 to discharge through the passageway 87 upon actuation of the solenoid 59' to unseat the diaphragm 51' from the seat 48' permitting the discharge of the mixed fluid at a predetermined temperature into the chamber 88 through the passageways 89 and 19 to discharge through the outlet member 17.

It is thus evident that a mixing valve is disclosed which may be fabricated from a simple casting which may be suitably molded and cast and which may be readily machined to form the various chambers thereof by simple machining operations such as drilling, reaming or boring to produce the chambers of various shapes and size for the various parts of the valve.

The various parts on the hot water side may be readily assembled from one end of the valve beginning with the piston and saddle assembly and the thermostatic control element may be readily assembled from the mixing side of the valve together with the other associated parts so that a mixing valve is produced which may be readily assembled for production and disassembled in the reverse order to provide for the necessary inspection and repair of the parts thereof. The assembled mixing valve may be readily assembled by assembling the enclosure elements 13 and 13' with the securing means 16. The solenoids 59 and 59' may be readily mounted on the extensions 14 and 14'. The assembled mixing valve may be suitably mounted in position on the apparatus with which it is used through suitable brackets 92 and 93, Figures 1, 2 and 3.

The various hot and cold fluid connections may be readily attached to the threaded cold and hot water connections 11 and 12, respectively, and a suitable hose connection may be made to the outlet member 17. In order to keep the valve free from accumulation of sediment, the mixing valve may be drained through the drain plug 94.

When the mixing valve 10, as described above with reference to Figures 1 to 4, inclusive, is assembled into position with the apparatus designed to utilize the valve, and when the control valves for the inlet openings 11 and 12 are opened, respectively, for the hot and cold fluids, if hot water is desired, the solenoid 59 is suitably actuated unseating the valve 56 causing the diaphragm 51 to unseat from its valve seat 48 permitting the passage of the hot fluid to the chamber 48 through the passageway 49 of the hot water by-pass member 46 directly to the passageway 18 into the outlet member 17. The hot fluid which might have passed through the hot water check valve in this stage of the operation is prevented from being discharged through the passage 19 by the diaphragm valve 51' being kept closed through the spring-biased valve 56'. The back pressure of the fluid within the chamber 27, therefore, closes the seal 32 of the hot water check valve 26 preventing further flow of fluid through the chamber permitting only the hot fluid to be by-passed through the outlet member 17. Any hot fluid which enters the mixing chamber causes the thermostatic control element 72 to actuate to seat the piston 65' against the hot water valve seat 41, thus shutting off any flow of fluid therethrough. The cold water which passes through the cold water check valve 21 is prevented from being discharged because the diaphragm 51' is still seated since the control solenoid 59' has not been energized. The back pressure of the cold fluid will seal the disk seal 24 of the cold water check valve 21 preventing any further entrance of cold water into the mixing valve.

When it is desired to have mixed fluid of a predetermined temperature corresponding to a predetermined range of the thermostatic control element 72 discharged from the outlet member 17, the solenoid 59 is deenergized causing the closing of the diaphragm valve 51 upon its seat 48 so that the hot fluid is then discharged through the check valve 26. The solenoid 59' is then actuated lifting the pilot valve 56' from its seat causing the diaphragm 51' to be opened, unseating the diaphragm from its seat 48' and permitting flow of the mixing fluid from the chamber 37 through the passages 90 and 91, Figure 8, into the passageway 87 to the chamber 88 discharging through the ports 89 into the passageway 19. From the passageway 19, the mixing fluid may be discharged through the outlet member 17.

The hot fluid may then enter through the hot water check valve 26 to the ports 45 formed by the hot water seat 41 through the passage 66 and through the interior passage 67 of the piston 65' into the passageway 36 and to the chamber 37. The initial temperature of the hot fluid is relatively high so that the thermostatic control element 72 tends to move the piston 65' into position as shown in Figure 5, forming the passage 77 to permit the flow of cold water through the cold water check valve to mix with the hot fluid in the mixing chamber 37. The thermostatic control element fluctuates until it reaches a substantially stable position of operation so that simultaneously cold fluid and hot fluid are proportionately mixed and discharged into the mixing chamber to mix to the temperature controlled within the predetermined range maintained by the thermostatic control element. In the stable operation of the mixing valve for the discharge of the mixed fluids, the piston 65' will take an intermediate operating position between that shown in Figure 4 with the cold water supply shut-off and the position in Figure 5 with the hot fluid shut-off. The mixing valve may be operated for a predetermined time when it is desired to deliver a mixed fluid of hot and cold water of a predetermined temperature, whereupon the solenoid 59' may be energized cutting off the flow of the mixed fluid; and the solenoid 59 may be operated to again permit the discharge of the hot fluid through the hot fluid by-pass, as previously described.

It is thus evident that the mixing valve of this invention will furnish not only hot fluid of a known temperature, but also a mixed fluid having a temperature which is thermostatically regulated within a predetermined range of temperature desired. If it is desired to have cold fluid discharged within the device with which this mixing valve is utilized, a suitable cold water by-pass may be provided as is well known in the art. Other arrangements may be had as will be understood in the art and the mixing valve may be operated within predetermined ranges for the mixing fluid by the utilizing of thermostatic control elements having predetermined temperature characteristics in the range of temperature desired.

Another of the features of this invention resides in limiting the maximum forces that may be applied to the body structure of the fluid mixing valve. Such limitation results from the use of the piston and saddle assembly 65 provided with the over-travel spring 69, Figure 4. This spring has a much greater spring pressure than the spring 74; and, as a consequence of this, it is not flexed to any appreciable degree until the piston 65' seats against the hot water seat 41. At this point, however, further increase in the temperature within the cavity causes further expansion of the elements 78 which, if unrestrained, would be exerted against the body 10 and might cause a rupture thereof. In the structure of my invention, however, the spring 69 merely compresses and permits the element 78 to expand without exerting excessive force on the body 10. It is thus impossible for rupture and damage to take place by reason of an excessively high fluid temperature within the mixing valve.

While I have shown particular embodiments of my invention, it will, of course, be understood that I do not wish to be limited thereto, since many modifications both in the elements em-

I claim as my invention:

1. In a device for mixing fluids, a hollow body provided with openings at each end, a hot fluid chamber formed at one end of the hollow body and a mixing fluid chamber formed contiguous to the other opening of said hollow body, a hot fluid inlet to the hot fluid chamber, a cold fluid inlet operatively connected to the mixing fluid chamber, closure means for closing the open ends of the hollow body, outlet means comprising a passageway operatively connected to each of the aforesaid chambers whereby fluid may be discharged therefrom, a detachable mixing fluid receptacle operatively mounted in the mixing chamber contiguous to the end of the hollow body and operatively connected to the outlet means for the device, valve means operatively connected to the open ends of the body and to the aforesaid receptacle, whereby upon the operation of the aforesaid valve means a mixed fluid is adapted to be discharged from the mixed chamber to the aforesaid outlet means for discharging fluid from the device.

2. In a device for mixing fluids, a hollow body open at both ends, closure means including a diaphragm valve adapted for sealing the ends of the hollow body, a hot fluid chamber formed in one end of the hollow body, a mixing fluid chamber formed in the other end of said hollow body, a hot fluid inlet operatively connected to the hot fluid chamber, a cold fluid inlet operatively connected to the mixing fluid chamber, a discharge outlet for the hot fluid and the mixed fluids operatively connected to the hot fluid chamber and to the mixed fluid chamber, a detachable by-pass receptacle operatively mounted in the hot fluid chamber and operatively connected to the hot fluid chamber and to the fluid outlet, one of the aforesaid diaphragm valves operatively mounted for controlling the flow of fluid through the by-pass receptacle, check valve means for the hot fluid mounted within the hollow body contiguous to the hot fluid chamber permitting the flow of the hot fluid to the mixing chamber but preventing the flow of the cold fluid to the hot fluid chamber, a cold fluid check valve operatively mounted in the cold fluid inlet permitting the cold fluid to flow to the mixed fluid chamber but preventing the return of the hot fluid through the cold fluid inlet, a thermostatically controlled valve means operatively mounted within the hollow body for controlling the flow of the hot fluid and the cold fluid to the mixing fluid chamber, and the other of said diaphragm control valves operatively mounted thus controlling the flow of the mixed fluid from the mixing fluid chamber whereby the mixing valve is adapted to discharge either hot fluid or mixed fluid as the diaphragm control valves are operated.

3. In a device for mixing fluid, a hollow body having an inlet for each of the fluids to be mixed, a hot fluid chamber contiguous to one of said inlets, a cold fluid chamber contiguous to the other of said inlets and operatively connected thereto, a mixing chamber contiguous to the cold fluid chamber operatively connected together and forming a valve seat therebetween, a hot fluid valve seat contiguous to the hot fluid chamber, a discharge outlet operatively connected to the mixing fluid chamber and to the hot fluid chamber, a thermostatically controlled hollow piston valve for controlling the flow of fluid from the hot fluid chamber and the cold fluid chamber to the mixing fluid chamber, spring means for biasing the thermostatic control hollow piston valve for normally biasing the hollow piston valve toward the valve seat between the cold water chamber and the mixing fluid chamber, and resilient means operatively connected between the hollow piston valve and the thermostatic control element therefore to permit over-travel of the thermostatic control element upon the hollow piston shutting off control of the hot fluid to the mixing fluid chamber upon excessive temperature of the hot fluid admitted to the device.

4. As an article of manufacture, a detachable mixing chamber receptacle for a mixing chamber of a mixing valve, said mixing chamber receptacle provided with a passageway adapted to be connected to the mixing chamber and forming a valve seat, said mixing chamber receptacle formed with a chamber operatively connecting the inlet of the receptacle to an outlet for the discharge of fluid to the discharge outlet of the mixing valve, and said mixing fluid receptacle formed with an opening adapted to mount a thermostatic control device and through which the thermostatic control element extends into the chamber of the receptacle and contiguous to the passageway to the chamber, and the peripheral surface of the receptacle formed with a plurality of recesses to provide the flow of the fluid from the mixing chamber into the mixing fluid receptacle.

5. As an article of manufacture, a mixing valve, said mixing valve comprising a hollow valve body having openings at each end, a closure element for each end of the hollow body comprising a diaphragm valve adapted to seal the entrance of the hollow body and means adapted for actuating the diaphragm valve in a preselected cycle of operation, said valve body including a hot fluid chamber contiguous to one of said diaphragm valves, and a mixing fluid chamber at the opposite end of the valve body contiguous to the other diaphragm valve, a hot fluid inlet operatively connected to the hot fluid chamber, a cold fluid inlet operatively connected to the mixing fluid chamber, a detachable by-pass receptacle operatively connected to the hot fluid chamber and forming a seat for the aforesaid valve means, a mixing chamber receptacle detachably mounted within the mixing chamber providing a seat for the other diaphragm valve means operatively connected to the mixing chamber, a discharge outlet for the mixing valve operatively connected to the by-pass receptacle and to the mixing chamber receptacle whereby hot fluid and mixed fluid may be discharged from the mixing valve, a hot fluid valve seat contiguous to the hot fluid chamber and adapted to discharge hot fluid into the mixing valve chamber, a hot fluid check valve mounted contiguous to the hot fluid chamber permitting the discharge of hot fluid in one direction into the mixing fluid chamber, spring-biased piston valve means adapted to shut off the hot fluid and the cold fluid to the mixing valve chamber, a thermostatic control element operatively connected to the piston valve means and supported by the mixing chamber receptacle whereby the flow of hot fluid and cold fluid to the mixing valve chamber is controlled within a predetermined range of temperature, a cold fluid check valve arranged in the cold fluid inlet permitting discharge of the cold fluid into the mixing valve and preventing the discharge of the mixed fluid into the cold fluid inlet, and means for controlling each of the diaphragm valve means for controlling the discharge of the hot fluid to the discharge outlet and the mixed fluid to the discharge outlet in a predetermined cycle of operation.

6. A mixing valve for hot and cold water comprising an open-ended hollow valve body, an inner wall of which defines a mixing chamber, two spaced inlets into said body communicating with said mixing chamber, an extensible temperature sensitive element mounted in said mixing chamber adjacent one end thereof, a valve operated thereby and controlling the passage of fluid into said chamber from said inlets, a passageway from one of said inlets to one open end of said valve body, a passageway from said mixing chamber to the other open end of said valve body, an outlet from said valve body communicating with each end thereof, closure means closing the open ends of said valve body and valve means in each end of said valve body and cooperating with said passageway from said inlet and said passageway from said mixing chamber for selectively controlling the passage of fluid from said passageways to said outlet.

7. In a fluid mixing valve, an open ended valve body having a central interior wall defining a mixing chamber, closure means for the open ends of said valve body and forming fluid passage chambers at the ends of said valve body, an inlet for water at one temperature leading into said mixing chamber, an outlet from said mixing chamber through one fluid passage chamber at one open end of said valve body, a discharge outlet from said valve body communicating with both of said fluid passage chambers, an inlet for water at a different temperature leading into said valve body and communicating with the opposite end of said mixing chamber from said outlet and also communicating with the other fluid passage chamber at the other open end of said valve body, thermal responsive valve means within said mixing chamber controlling the passage of water therein from said inlets and the discharge of mixed water from said one end of said mixing chamber, and fluid control elements at the ends of said valve body, selectively operable to control the flow of fluid from either fluid passage chamber at either open end of said valve body through said discharge outlet.

8. In a mixing valve for mixing water at different temperatures and delivering water at an intermediate temperature, an elongated hollow valve body open at its ends and having an intermediate portion, the hollow interior of which defines a mixing chamber, an inlet adjacent one end of said valve body for water at one temperature, an inlet for water at a different temperature adjacent the other end of said valve body, a flow passage from one inlet to one open end of said valve body and to said mixing chamber, a flow passage from said other inlet to said mixing chamber, a flow passage from said mixing chamber to the opposite open end of said valve body from said first-mentioned inlet, closure means for the open ends of said valve body and with said valve body forming fluid passage chambers, and valve means within said closure means and controlling the passage of fluid through the open ends of said valve body for discharge therefrom.

9. A fluid mixing valve having a longitudinally extending hollow open ended valve body having an inner cylindrical wall portion, a valve seat adjacent one end of said wall portion, and valve means in said wall portion and with said seat dividing said body into a mixing chamber disposed adjacent one end of said body and a liquid distribution chamber in alignment with said mixing chamber and disposed adjacent the other end of said valve body, a cold water inlet into said mixing chamber, a hot water inlet into said liquid distribution chamber, a discharge passageway from said mixing chamber through the open end of said valve body adjacent said mixing chamber, a temperature sensitive element within said mixing chamber and operatively connected with said valve means, for controlling the flow of fluid from said distribution chamber into said mixing chamber and from said cold water inlet into said mixing chamber and through said one open end of said valve body, another inlet into said valve body communicating with the other open end of said valve body and with said distribution chamber, a discharge outlet from said valve body communicating with each open end thereof, and transverse wall means at the ends of said valve body having passageways therein communicating with said discharge passageway and defining valve seats at their upstream ends, closure means closing the ends of said valve body, fluid operated valve means movable into engagement with said valve seats and contained within said closure means, and controlling the passage of fluid through said discharge outlet from either end of said valve body.

10. In a fluid mixing valve, a valve body comprising a hollow body part having transverse wall portions at each end thereof and an intermediate portion between said wall portions, defining a mixing chamber, a discharge outlet from said valve body axially aligned passageways in said transverse wall portions communicating with said discharge outlet, the entering ends of which define valve seats, an inlet to said valve body adjacent one end thereof, a passage from said inlet through one of said transverse wall portions to the outer end of said valve body, said other inlet communicating directly with said mixing chamber, a passage from said mixing chamber through the other of said end wall portions to the other open end of said valve body, valve means cooperating with said valve seats and controlling the passage of fluid through said discharge outlet, and means maintaining the open ends of said valve body closed comprising end cap pieces secured to said valve body and securing said valve means thereto.

11. In a mixing valve, a hollow valve body having a pair of wall portions extending transversely of said valve body adjacent the ends thereof, each of which has a cavity therein facing an end thereof, said valve body also having a central interior wall portion intermediate said transverse wall portions and forming a mixing chamber for hot and cold water, a thermal responsive valve means in said mixing chamber to control the passage of hot and cold water to said mixing chamber and the discharge of mixed water from one end of said mixing chamber through one of said cavities, an inlet for hot water leading into said valve body and communicating with the other open end of said valve body through one of said transverse wall portions and also communicating with said mixing chamber through said valve means, an inlet for cold water leading into said valve body and communicating directly with said mixing chamber through said valve means, and with said other open end of said valve body through said mixing chamber, discharge passageways in said transverse wall portions leading from said cavities, the open ends of said cavities forming valve seats and valve means cooperating with said valve seats and selectively operable to control the passage of fluid through said openings for discharge through said discharge passages.

12. In a mixing valve, a hollow valve body having a pair of inserts fitted therein, each of which is adjacent one end of said valve body and forms a transverse wall portion having a cavity therein opening to the outer end of said valve body and also having a passageway communicating with said cavity and leading to a common discharge opening from said valve body, said valve body also having a central interior wall portion intermediate said transverse wall portions and forming a mixing chamber for hot and cold water, a thermal responsive valve means in said mixing chamber, an inlet for hot water leading into said valve body and communicating with one of said cavities and also communicating with one end of said mixing chamber through said valve means, an inlet for cold water leading into said valve body and communicating with said mixing chamber through said valve means, and with said other open end of said valve body through said mixing chamber, the open ends of said cavities forming valve seats, and valve means cooperating with said valve seats and selectively operable to control the passage of fluid through said cavities, for discharge from said valve body.

FRANK E. OBERMAIER.

REFERENCES CITED

The following references are of record in the file of this patent:

UNITED STATES PATENTS

| Number | Name | Date |
|---|---|---|
| 1,541,465 | Belknap | June 9, 1925 |
| 1,733,421 | Mauran | Oct. 29, 1929 |
| 1,962,214 | Russell | June 12, 1934 |
| 2,099,563 | Henning | Nov. 16, 1937 |
| 2,141,614 | Mott | Dec. 27, 1938 |
| 2,146,930 | Bassett | Feb. 14, 1939 |
| 2,269,404 | Haven | Jan. 6, 1942 |
| 2,291,603 | Barker | Aug. 4, 1942 |
| 2,296,266 | Breckenridge | Sept. 22, 1942 |
| 2,317,717 | Bauman | Apr. 27, 1943 |
| 2,331,562 | Martin | Oct. 12, 1943 |
| 2,435,882 | Fawkes | Feb. 10, 1948 |
| 2,453,409 | Chace | Nov. 9, 1948 |
| 2,476,320 | Paulus | July 19, 1949 |
| 2,503,901 | Chace | Apr. 11, 1950 |